(12) United States Patent
Chen et al.

(10) Patent No.: US 11,281,277 B2
(45) Date of Patent: Mar. 22, 2022

(54) POWER MANAGEMENT FOR PARTIAL CACHE LINE INFORMATION STORAGE BETWEEN MEMORIES

(71) Applicant: Intel Corporation, Santa Clara, CA (US)

(72) Inventors: Yingwen Chen, Shanghai (CN); Tao Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/651,496

(22) PCT Filed: Nov. 21, 2017

(86) PCT No.: PCT/CN2017/112007
§ 371 (c)(1),
(2) Date: Mar. 27, 2020

(87) PCT Pub. No.: WO2019/100186
PCT Pub. Date: May 31, 2019

(65) Prior Publication Data
US 2020/0264681 A1      Aug. 20, 2020

(51) Int. Cl.
*G06F 1/30* (2006.01)
*G06F 1/3234* (2019.01)
*G06F 11/30* (2006.01)
*G06F 12/0895* (2016.01)
*G06F 13/16* (2006.01)

(52) U.S. Cl.
CPC .............. *G06F 1/30* (2013.01); *G06F 1/3275* (2013.01); *G06F 11/3037* (2013.01); *G06F 11/3058* (2013.01); *G06F 12/0895* (2013.01); *G06F 13/1668* (2013.01)

(58) Field of Classification Search
CPC ...... G06F 1/30; G06F 1/3275; G06F 11/3037; G06F 11/3058
See application file for complete search history.

(56) References Cited

U.S. PATENT DOCUMENTS

| | | | |
|---|---|---|---|
| 9,570,159 B1 * | 2/2017 | Wakchaure | ........... G06F 3/0625 |
| 9,910,728 B2 * | 3/2018 | Das | ........... G06F 3/0673 |
| 10,108,548 B2 * | 10/2018 | Rozario | ................ G06F 12/084 |
| 2002/0124198 A1 | 9/2002 | Bormann et al. | |
| 2005/0138296 A1 | 6/2005 | Coulson et al. | |
| 2006/0031714 A1 * | 2/2006 | Batchelor | ........... G06F 11/1441 714/14 |

(Continued)

FOREIGN PATENT DOCUMENTS

| | | |
|---|---|---|
| CN | 104572511 A | 4/2015 |
| WO | 2017065910 A1 | 4/2017 |

OTHER PUBLICATIONS

International Search Report and Written Opinion for International Patent Application No. PCT/US2017/112007, dated Jul. 27, 2018, 10 pages.

*Primary Examiner* — Raymond N Phan
(74) *Attorney, Agent, or Firm* — Jordan IP Law, LLC

(57) ABSTRACT

An embodiment of a semiconductor package apparatus may include technology to store cache line spare information in a first memory, detect a first power state change for the first memory, and save the cache line spare information to a second memory based on the detected first power state change. Other embodiments are disclosed and claimed.

24 Claims, 8 Drawing Sheets

(56) References Cited

U.S. PATENT DOCUMENTS

| | | |
|---|---|---|
| 2006/0072369 A1* | 4/2006 | Madter .................. G11C 5/141 |
| | | 365/232 |
| 2012/0311248 A1 | 12/2012 | Goodman |
| 2016/0055083 A1 | 2/2016 | Rozario et al. |
| 2017/0185473 A1 | 6/2017 | Das et al. |
| 2020/0257346 A1* | 8/2020 | Wells .................... G06F 3/0619 |

* cited by examiner

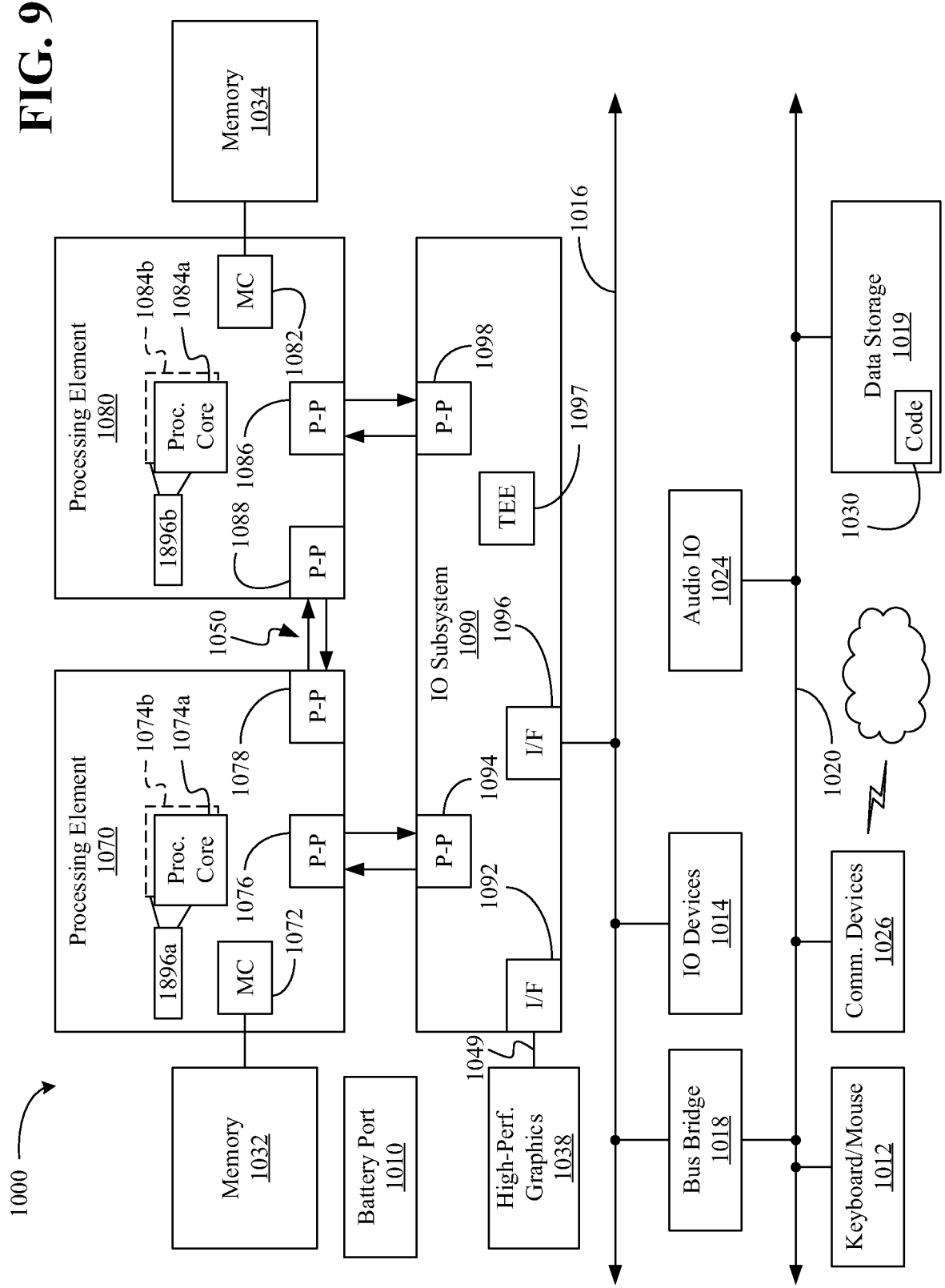

POWER MANAGEMENT FOR PARTIAL CACHE LINE INFORMATION STORAGE BETWEEN MEMORIES

CROSS REFERENCE TO RELATED APPLICATIONS

The present application is a U.S. National Phase Patent Application, which claims the benefit of priority to International Patent Application No. PCT/CN2017/112007 filed on Nov. 21, 2017.

TECHNICAL FIELD

Embodiments generally relate to memory systems. More particularly, embodiments relate to power management for partial cache line sparing (PCLS).

BACKGROUND

In dynamic random access memory (DRAM) systems, both hard and soft errors may occur in the bits of the DRAM. Hard errors corrupt bits in a repeatable manner and concern physical damage to the memory cells whereas soft errors comprise random corrupt bits that may be corrected using an error correction technique and parity data for the cache line including a defective bit. To avoid hard errors, sparing techniques may be used to replace portions of the memory having the errors with other spare memory not having errors. Cache line sparing may utilize a portion of cache memory to correct failed portions of memory.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an example of a system according to an embodiment.

DESCRIPTION OF EMBODIMENTS

Various embodiments described herein may include a memory component and/or an interface to a memory component. Such memory components may include volatile and/or non-volatile memory. Non-volatile memory may be a storage medium that does not require power to maintain the state of data stored by the medium. In one embodiment, the memory device may include a block addressable memory device, such as those based on NAND or NOR technologies. A memory device may also include future generation non-volatile devices, such as a three dimensional crosspoint memory device, or other byte addressable write-in-place non-volatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
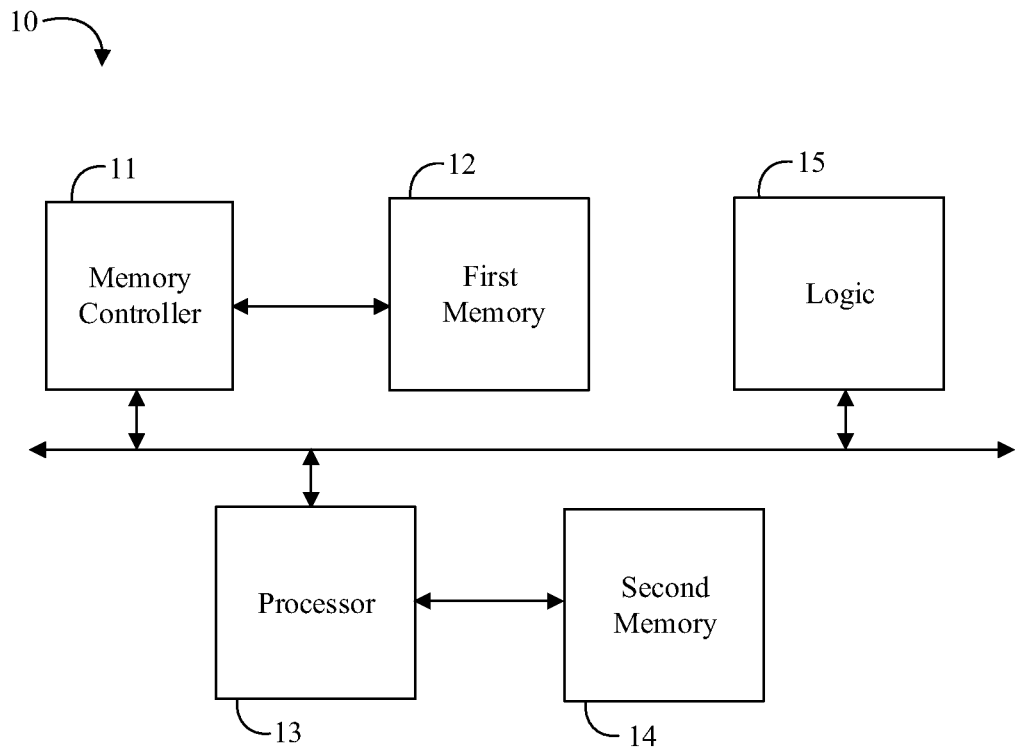
FIG. 1 is a block diagram of an example of an electronic processing system according to an embodiment.

Turning now to FIG. 1, an embodiment of an electronic processing system 10 may include a memory controller 11, a first memory 12 communicatively coupled to the memory controller 11, a processor 13 communicatively coupled to the memory controller 11, a second memory 14 communicatively coupled to the processor 13, and logic 15 communicatively coupled to the memory controller 11, the first memory 12, the processor 13, and the second memory 14 to store cache line spare information in the first memory 12, detect a first power state change for the first memory 12, and save the cache line spare information to the second memory 14 based on the detected first power state change. For example, the cache line spare information may include instructions to correct one of more failed portions of memory of the electronic processing system. For example, the logic 15 may be configured to determine if the detected first power state change results in a potential loss of data in the first memory 12. In some embodiments, the second memory 14 may include reserved system memory, and the logic 15 may be further configured to save the cache line spare information to the reserved system memory based on the detected first power state change. For example, the logic 15 may also be configured to limit access to the reserved system memory. In any of the embodiments herein, the logic 15 may be configured to detect a second power state change, and restore the cache line spare information to the first memory 12 from the second memory 14 based on the detected second power state change. For example, the logic 15 may be configured to restore the cache line spare information prior to general memory access (e.g., to system memory).

Embodiments of each of the above memory controller 11, first memory 12, processor 13, second memory 14, logic 15, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the second memory 14, persistent storage media, or other system memory may store a set of instructions which when executed by the processor 13 cause the system 10 to implement one or more components, features, or aspects of the system 10 (e.g., the logic 15, storing cache line spare information in first memory, detecting a first power state change for the first memory, saving the cache line spare information to second memory based on the detected first power state change, etc.).

Figure 2:
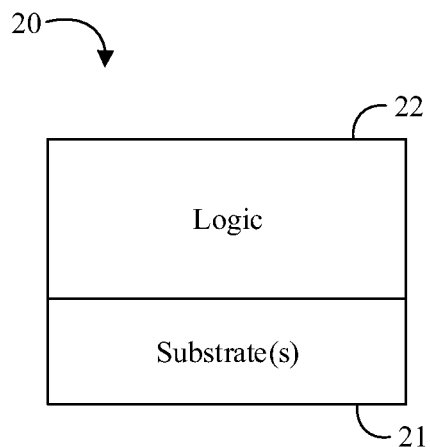
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to store cache line spare information in a first memory, detect a first power state change for the first memory, and save the cache line spare information to a second memory based on the detected first power state change. For example, the logic 22 may be configured to determine if the detected first power state change results in a potential loss of data in the first memory. In some embodiments, the second memory may include reserved system memory, and the logic 22 may be further configured to save the cache line spare information to the reserved system memory based on the detected first power state change. For example, the logic 22 may also be configured to limit access to the reserved system memory. In any of the embodiments herein, the logic 22 may be configured to detect a second power state change, and restore the cache line spare information to the first memory from the second memory based on the detected second power state change. For example, the logic 22 may be configured to restore the cache line spare information prior to general memory access.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
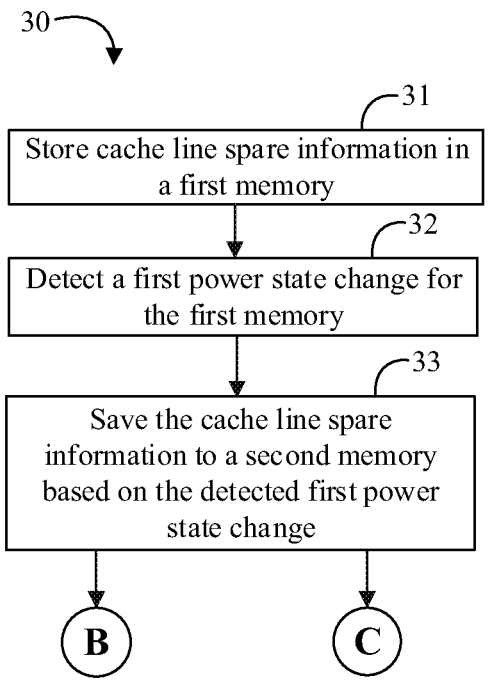
FIGS. 3A to 3C are flowcharts of an example of a method of cache line sparing according to an embodiment.
Figure 3B:
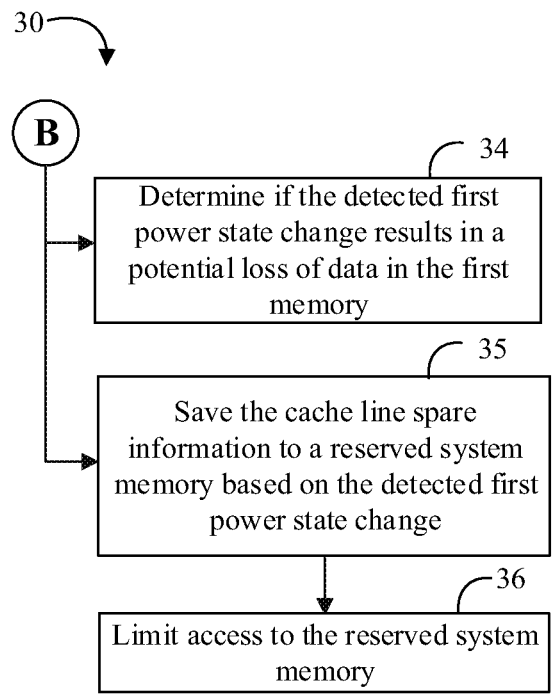
Figure 3C:
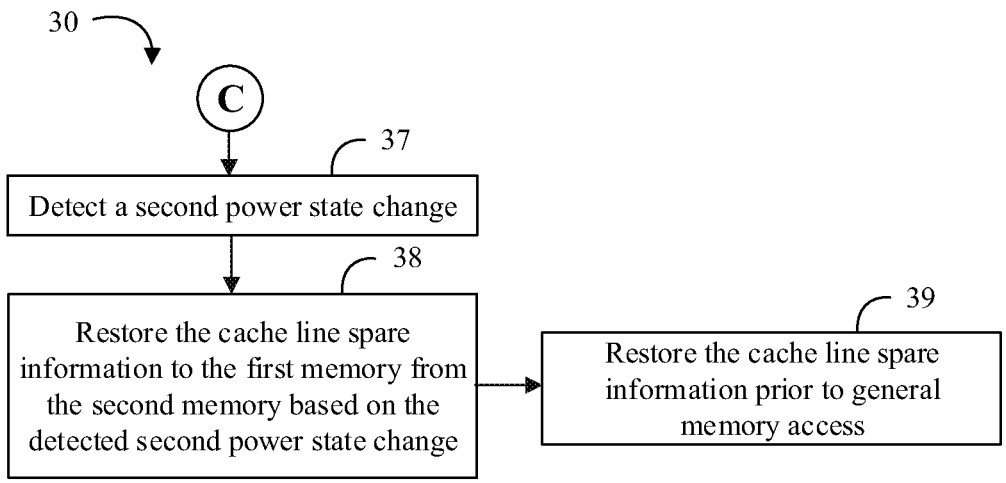

Turning now to FIGS. 3A to 3C, an embodiment of a method 30 of cache line sparing may include storing cache line spare information in a first memory at block 31, detecting a first power state change for the first memory at block 32, and saving cache line spare information to a second memory based on the detected first power state change at block 33. For example, the method 30 may include determining if the detected first power state change results in a potential loss of data in the first memory at block 34. Some embodiments of the method 30 may further include saving the cache line spare information to a reserved system memory based on the detected first power state change at block 35, and limiting access to the reserved system memory at block 36. In any of the embodiments, the method 30 may include detecting a second power state change at block 37, and restoring the cache line spare information to the first memory from the second memory based on the detected second power state change at block 38. For example, the method 30 may include restoring the cache line spare information prior to general memory access at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Some embodiments may advantageously support partial cache line sparing (PCLS) on a power management (e.g., S3) enabled platform. PCLS may refer to a sparing technique that detects a single bit persistent fault within a cache-line and then replaces the entire nibble (e.g., 4-bits) with spare capacity within the central processor unit (CPU), for example, in an integrated memory controller (iMC) of the CPU. Spare capacity may be added within the iMC and may be parity protected. For example, up to 16 single DRAM nibbles may be replaced per memory channel. PCLS may be well suited for high bandwidth memory (HBM) where the HBM die may be packaged with the CPU in the same socket. If hard failure errors happen on the HBM, the basic input/output system (BIOS) may need to disable an HBM channel or the whole HBM depending on the failure locations. PCLS may provide recovery for these errors.

For a server system, for example, a memory device failure may result in a service events, or even server crashes (e.g., if the memory failure is not recovered). Some server systems may implement larger memory arrays, which may increase the likelihood of a memory device failure. For example, a relatively large percentage of hard failures may be single bit failures. Any increase in weak bits due to scaling may also result in single bit fails. For systems which require high reliability and stability, such as an autonomous driving system, uncorrected memory device failures may cause problems which affect the need reliability and stability. PCLS may improve the reliability and stability of a system (e.g., a server system, an autonomous driving system, etc.) by providing recovery for various memory errors.

An electronic system may define any of a variety of power management modes, policies, states, etc. with corresponding changes in the power scheme. A MICROSOFT WINDOWS system may have defined system power states S0 through S5, where power state S0 may correspond to a working state, power state S5 may correspond to a shutdown state, and power states S1 through S4 may correspond to sleep states with each successive state corresponding to more of the system being powered down. In some systems, sleep state S3 may correspond to a power state where a memory controller is powered down (e.g., along with other system components).

In some other systems, PCLS may need to be disabled on power-management enabled systems (e.g., or vice versa where the power management features may need to be disabled if PCLS is enabled). For example, in some systems PCLS spare data stored within a memory controller may be lost after resuming from a system power state (e.g. an S3 sleep state) because the memory controller may be powered down in the S3 sleep state. Advantageously, some embodiments may save the PCLS spare data to another memory location prior to transitioning to the S3 sleep state such that the PCLS spare data may be restored when resuming from the S3 sleep state. For example, the other memory location may include a volatile memory location that maintains power in the S3 state, or a non-volatile memory (NVM) location. For applications where reliability, stability, and power consumption are important, some embodiments may provide both PCLS capabilities and power management capabilities to accelerate single bit memory error correction speed, improve system reliability and stability, and save power when the system is idle.

Some embodiments may store spare data to the reserved system management mode (SMM) memory when entering the S3 sleep state, and restore the spare data from the reserved SMM memory space to the memory controller when resuming from the S3 sleep state. For example, the SMM memory may include volatile memory as a part of the system DRAM memory which maintains power in the S3 state. The spare data may be restored to the memory controller before any memory access to ensure that the system does not use the failed nibble data. Some embodiments may also ensure that the reserved memory may only be accessed by the PCLS-S3 save/restore routines. Some embodiments may save the PCLS data to an OS-invisible memory space such as Advanced Configuration and Power Interface (ACPI) reclaim memory space, SMM memory space, or other reserved/protected memory space. For example, the SMM memory space may only be accessed by the BIOS in a CPU system management mode. Advantageously, SMM memory may be protected at the silicon level. No other OS/firmware/etc. routine/process may access the memory reserved for the PCLS spare data, even when the PCLS feature is enabled. Advantageously, some embodiments may provide a system with both PCLS and power management enabled (e.g., S3 or another low power mode).

Figure 4:
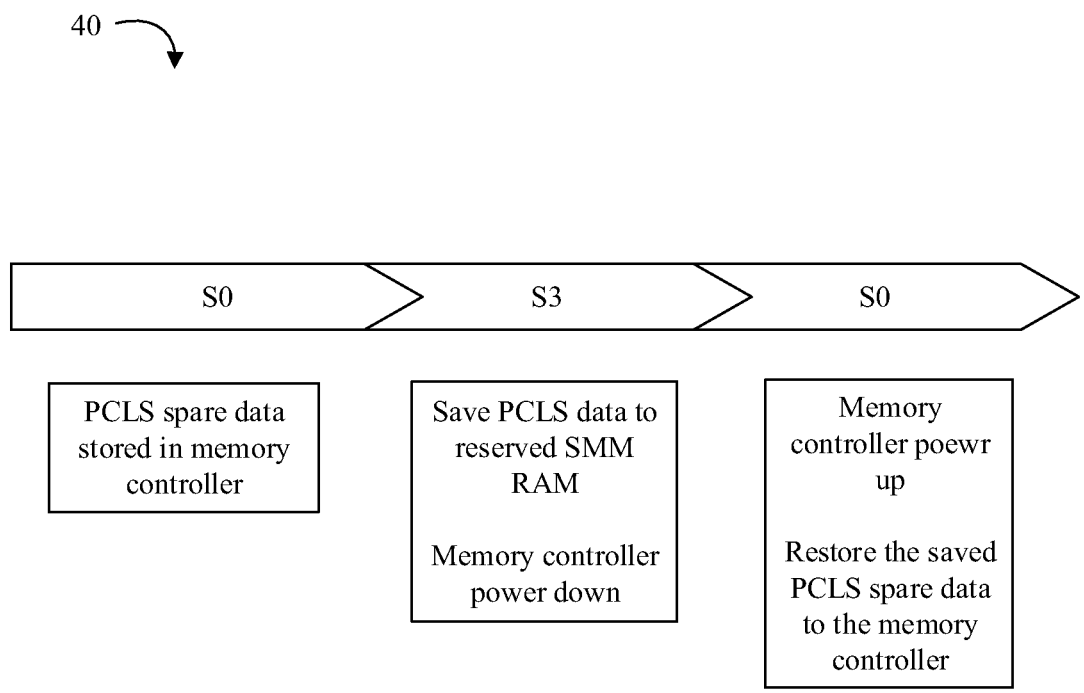
FIG. 4 is an illustrative diagram of an example of a workflow according to an embodiment.

Turning now to FIG. 4, an embodiment of an illustrative workflow 40 may start with a system in a working power state (e.g., power state S0). In the working power state, the cache line sparing (e.g., PCLS) may be enabled and the cache spare information may be stored in volatile memory (e.g., SRAM in the memory controller). The memory controller may detect a change in the power state (e.g., from working state S0 to sleep state S3). For example, transitions between power states may be relatively orderly and detecting a power state change may correspond to receiving a signal from the OS, BIOS, firmware, etc. which indicates a new power policy/mode/state/etc. The memory controller may determine which power states maintain power to the memory controller and which modes power down the memory controller. For example, the memory controller may maintain a table or configuration file to specify which states maintain power to the memory controller. The memory controller may use the indicated new power state as an index to a look-up table to determine if the new power state may cause a loss of the cache spare information and, if so, the memory controller may save the cache spare data in another memory location (e.g., reserved SMM RAM) that maintains power in the new power state or maintains the data without power (e.g., NVM). In some embodiments, sleep state S1 may not power down the memory controller, but each of sleep states S2, S3, and S4 may power down the memory controller. During a subsequent resume from the low power mode (e.g., from the sleep state S3 to the working state S0), the memory controller may restore the cache data information to the memory controller prior to any general memory access.

Figure 5:
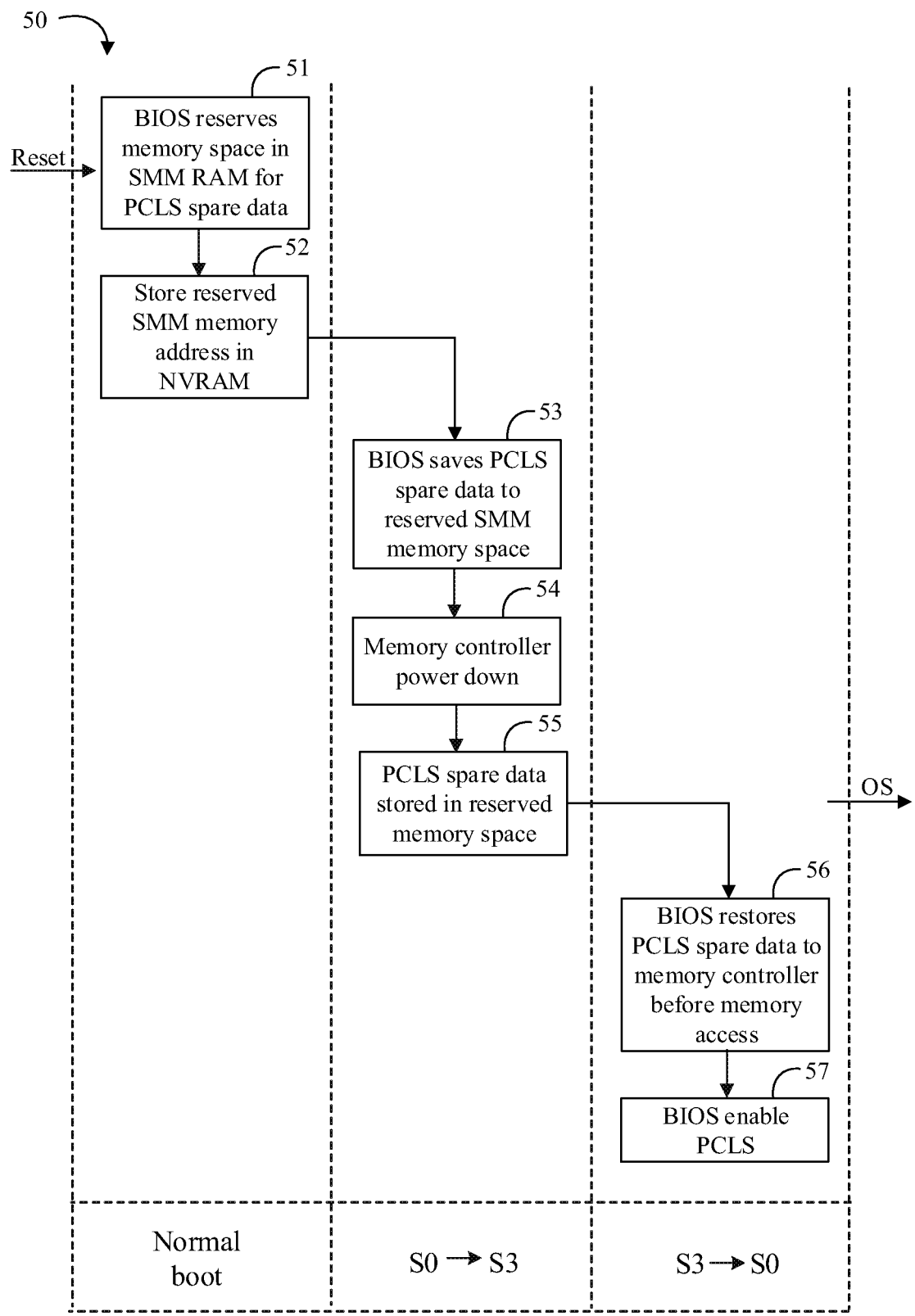
FIG. 5 is a flowchart of an example of a method of supporting PCLS on a S3 enabled system according to an embodiment.

Turning now to FIG. 5, an embodiment of a method 50 of supporting PCLS on a S3 enabled system may include receiving a reset to initiate a normal system boot, after which the method 50 may include the BIOS reserving memory space in SMM RAM for PCLS spare data at block 51. For example, the BIOS may check the reserved memory space status by a write/read mechanism. If an error is found, the BIOS may reserve a different memory space in SMM RAM. Advantageously, the OS cannot see the reserved SMM memory space, so there may be no access to the reserved memory space by the OS/applications/etc. during runtime. Using the reserved SMM RAM space may ensure that no memory error may be generated in the reserved SMM memory space during runtime. The BIOS may then save the reserved memory space address to NVRAM at block 52, so the address information will not be lost in S3.

If the power state transitions from the working state S0 to the sleep state S3, the BIOS may save the PCLS spare data to the reserved SMM memory space at block 53, and then power down the memory controller at block 54 when the system enters the sleep state S3. While the system sleeps, the PCLS spare data may remain stored in the reserved memory space at block 55. Because the SMM RAM memory data is not lost in the sleep state S3, the PCLS spare data may be successfully saved in the sleep state S3.

When the power state transitions again from the sleep state S3 to the working state S0, the BIOS may restore the PCLS spare data to the memory controller at block 56 before any memory access. For example, some embodiments may restore the spare data to the memory controller after the memory controller initialization is done. At this point, the memory may be ready to use, but no memory access has been performed. The BIOS may then enable the PCLS function at block 57. At this point PCLS may be ready to use and control may pass to the OS after the BIOS completes the resume process.

Figure 6:
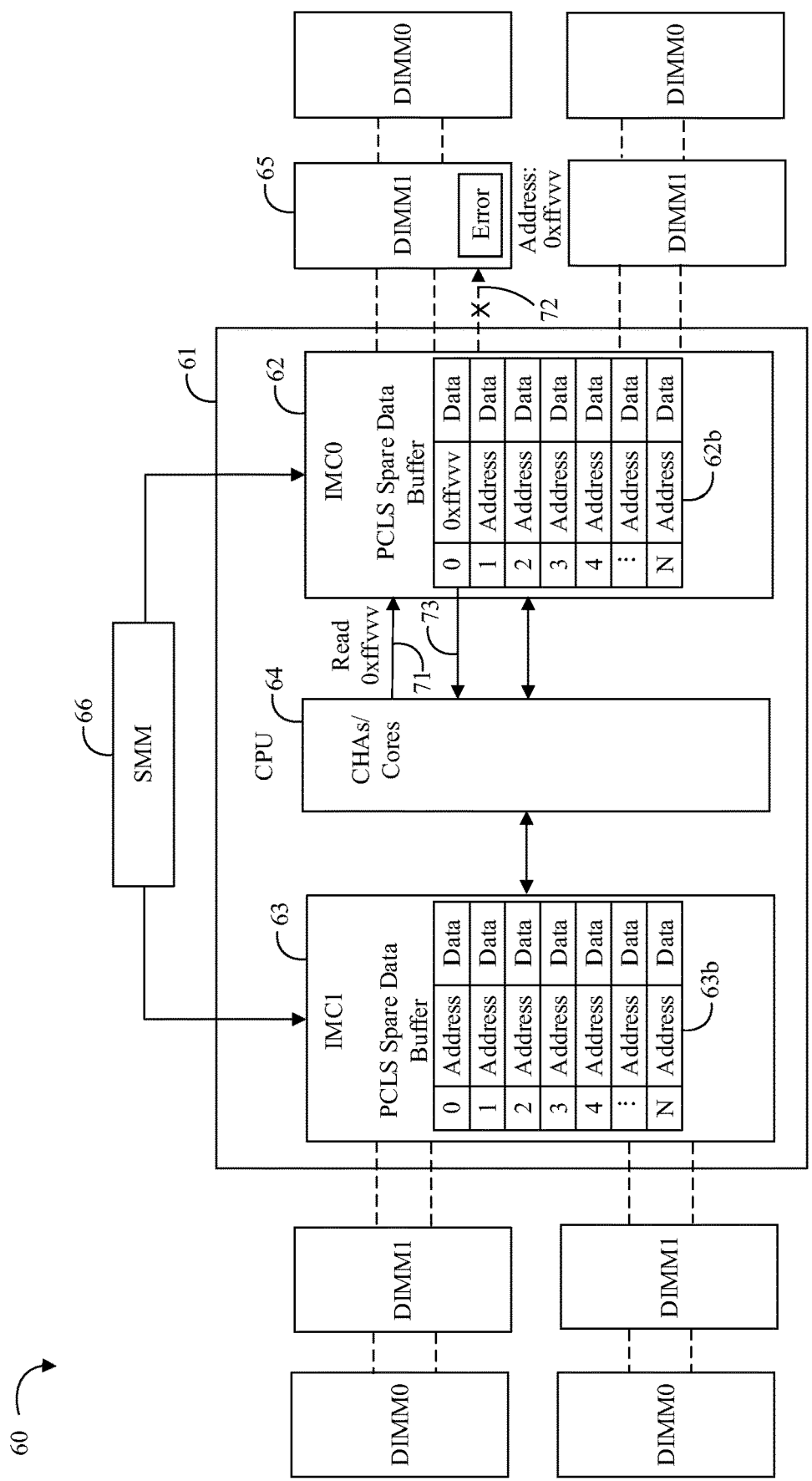
FIG. 6 is a block diagram of another example of an electronic processing system according to an embodiment.

Turning now to FIG. 6, an electronic processing system 60 may include a CPU 61 which has a first integrated memory controller (IMC0) 62 and a second integrated memory controller (IMC1) 63. The CPU 61 may also include a number of caching and home agents (CHAs)/cores 64 coupled between the IMC0 62 and the IMC1 63. Each of IMC0 62 and IMC1 63 may be coupled to one or more memory channels of multiple dual-inline memory module (DIMM) devices 65. Each of IMC0 62 and IMC1 63 may include respective PCLS spare data buffers 62b and 63b. For example, DIMM1 65 connected to IMC0 62 may have a single bit hard failure on the address: 0xffvvv. The failed nibble data may have been corrected and stored in the PCSL spare data buffer 62b. A CPU 61 read from memory address 0xffvvv may cause the PCLS work flow as follows:

1) The CPU 61 may send a reading memory address 0xffvvv message to IMC0 62 at point 71;

2) If PCLS is disabled, IMC0 62 will get failed data from DIMM1 65 at point 72, attempt to correct it, and then return incorrect data to the cache line. Because this hard failure nibble is not recovered, it could be easily turned into a multi-bit error which may crash the system. Every access may need error correction code (ECC) logic to do the correction, with a corresponding performance impact; and 3) If PCLS is enabled, IMC0 62 may compare address 0xffvvv with its PCLS buffer 62b. Because it matches, IMC0 62 may replace the failed bit of cache line with the PCLS nibble it maintains and return the corrected memory data at point 73.

Advantageously, each of IMC0 62 and IMC1 63 may be further coupled to SMM memory 66 to save the PCLS spare data in the event of a power loss the memory controllers IMC0 62 and/or IMC1 63. For example, each of the memory controllers IMC0 62, IMC1 63 may be configured to store cache line spare information in their respective buffers 62b, 63b, to detect a power state change which may result in potential data loss for their respective buffers 62b, 63b, and to save the cache line spare information from the buffers 62b, 63b to the SMM memory 66 if the detected power state change is determined to result in potential data loss (e.g., a transition from a working state S0 to a sleep state S3). For example, using the reserved SMM memory 66 may limit access to the cache line spare information stored in the SMM memory 66 (e.g., hiding the cache line spare information from the OS, applications, etc.). The memory controllers IMC0 62, IMC1 63 may also be configured to detect a second power state change (e.g., a transition from a sleep state S3 to a working state S0), and to restore the cache line spare information to the buffers 62b, 63b from the SMM memory 66 based on the detected second power state change. For example, the memory controllers IMC0 62, IMC1 63 may be configured to restore the cache line spare information prior to general memory access.

Figure 7A:
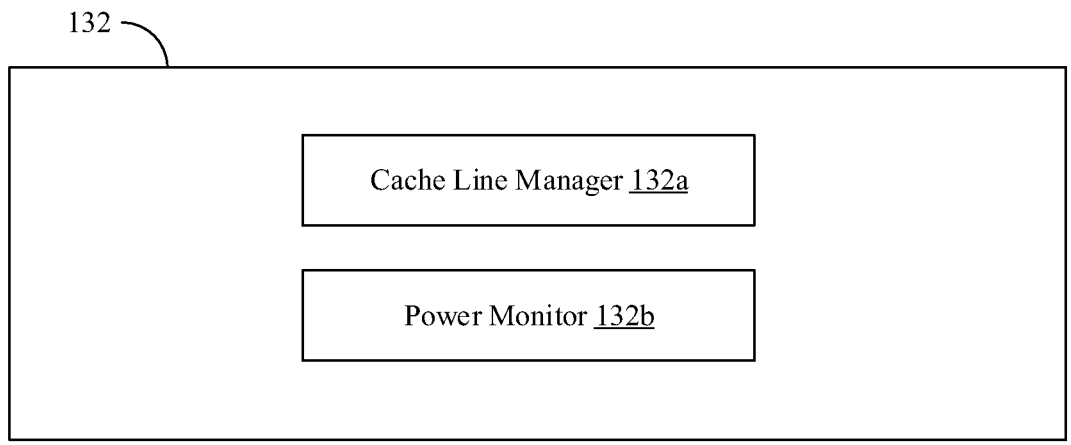
FIGS. 7A and 7B are block diagrams of examples of memory controller apparatuses according to embodiments.

FIG. 7A shows a memory controller apparatus 132 (132a-132b) that may implement one or more aspects of the method 30 (FIGS. 3A to 3C), the workflow 40 (FIG. 4), and/or the method 50 (FIG. 5). The memory controller apparatus 132, which may include logic instructions, configurable logic, fixed-functionality hardware logic, may be readily substituted for the logic 15 (FIG. 1), the logic 22 (FIG. 2), and/or the memory controllers IMC0 62, IMC1 63 (FIG. 6), already discussed. A cache line manager 132a may store cache line spare information in a first memory. A power monitor 132b may detect a first power state change for the first memory. The cache line manager 132a may save the cache line spare information to a second memory based on the detected first power state change. For example, the power monitor 132b may be configured to determine if the detected first power state change results in a potential loss of data in the first memory. In some embodiments, the second memory may include reserved system memory, and the cache line manager 132a may be further configured to save the cache line spare information to the reserved system memory based on the detected first power state change. For example, the cache line manager 132a may also be configured to limit access to the reserved system memory. In any of the embodiments herein, the power monitor 132b may be configured to detect a second power state change, and the cache line manager 132a may restore the cache line spare information to the first memory from the second memory based on the detected second power state change. For example, the cache line manager 132a may be configured to restore the cache line spare information prior to general memory access.

Figure 7B:
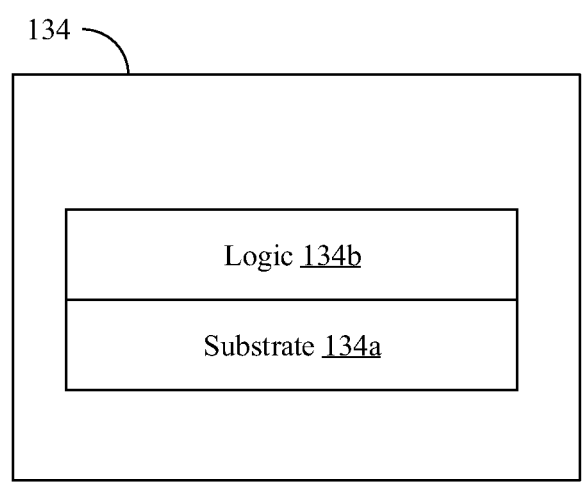

Turning now to FIG. 7B, memory controller apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3C), the workflow 40 (FIG. 4), and/or the method 50 (FIG. 5). Thus, the logic 134b may store cache line spare information in a first memory, detect a first power state change for the first memory, and save the cache line spare information to a second memory based on the detected first power state change. For example, the logic 134b may determine if the detected first power state change results in a potential loss of data in the first memory. In some embodiments, the second memory may include reserved system memory, and the logic 134b may save the cache line spare information to the reserved system memory based on the detected first power state change. For example, the logic 134b may also limit access to the reserved system memory. In any of the embodiments herein, the logic 134b may detect a second power state change, and restore the cache line spare information to the first memory from the second memory based on the detected second power state change. For example, the logic 134b may restore the cache line spare information prior to general memory access. In one example, the apparatus 134 is a semiconductor die, chip and/or package.

Figure 8:
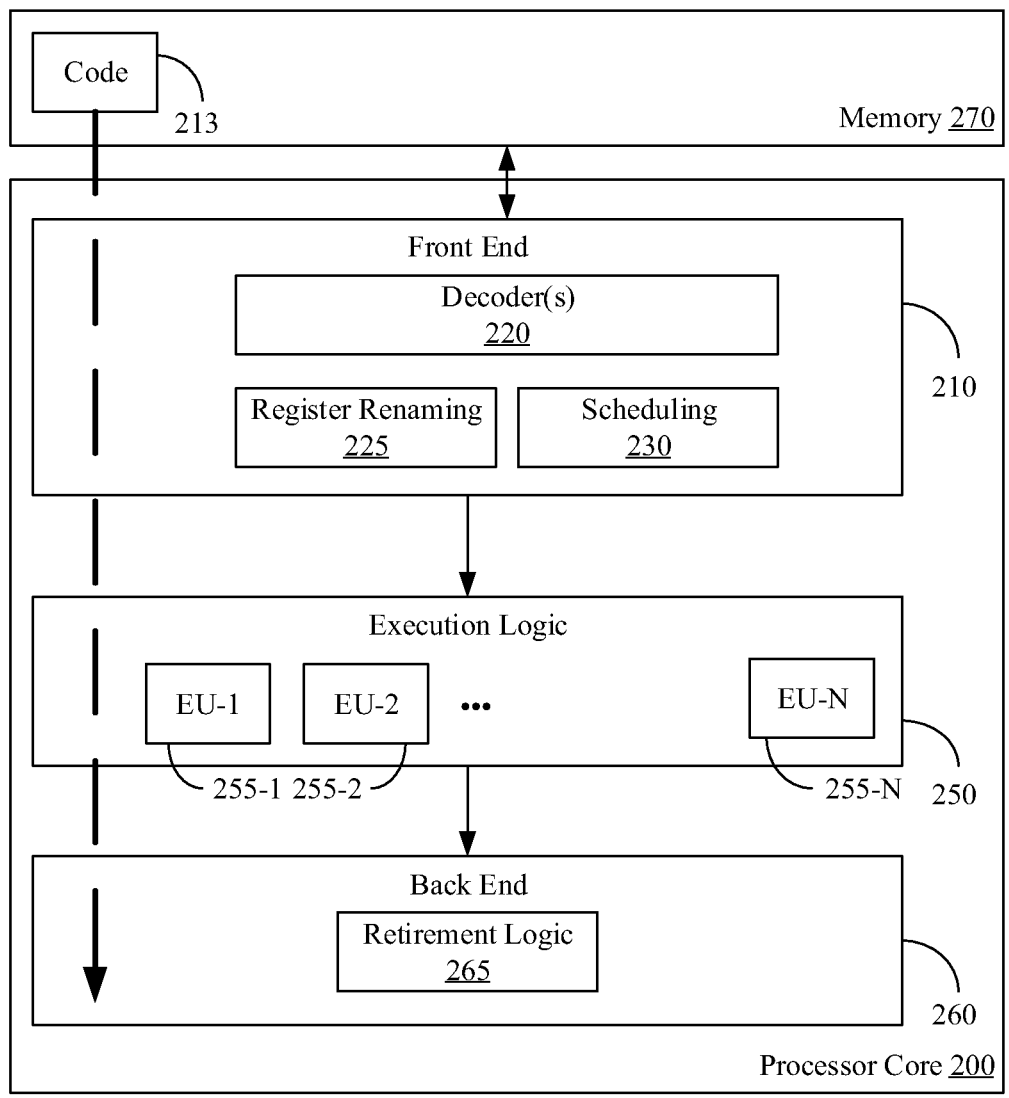
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3C), the workflow 40 (FIG. 4), and/or the method 50 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3C), the workflow 40 (FIG. 4), and/or the method 50 (FIG. 5), already discussed, and may be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology.

Additional Notes and Examples

Example 1 may include an electronic processing system, comprising a processor, first memory communicatively coupled to the processor, second memory communicatively coupled to the processor, and logic communicatively coupled to the processor, the first memory, and the second memory to store cache line spare information in the first memory, detect a first power state change for the first memory, and save the cache line spare information to the second memory based on the detected first power state change.

Example 2 may include the system of Example 1, wherein the logic is further to determine if the detected first power state change results in a potential loss of data in the first memory.

Example 3 may include the system of Example 1, wherein the second memory comprises reserved system memory, and wherein the logic is further to save the cache line spare information to the reserved system memory based on the detected first power state change.

Example 4 may include the system of Example 3, wherein the logic is further to limit access to the reserved system memory.

Example 5 may include the system of any of Examples 1 to 4, wherein the logic is further to detect a second power state change, and restore the cache line spare information to the first memory from the second memory based on the detected second power state change.

Example 6 may include the system of Example 5, wherein the logic is further to restore the cache line spare information prior to general memory access.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to store cache line spare information in a first memory, detect a first power state change for the first memory, and save the cache line spare information to a second memory based on the detected first power state change.

Example 8 may include the apparatus of Example 7, wherein the logic is further to determine if the detected first power state change results in a potential loss of data in the first memory.

Example 9 may include the apparatus of Example 7, wherein the logic is further to save the cache line spare information to a reserved system memory based on the detected first power state change.

Example 10 may include the apparatus of Example 9, wherein the logic is further to limit access to the reserved system memory.

Example 11 may include the apparatus of any of Examples 7 to 10, wherein the logic is further to detect a second power state change, and restore the cache line spare information to the first memory from the second memory based on the detected second power state change.

Example 12 may include the apparatus of Example 11, wherein the logic is further to restore the cache line spare information prior to general memory access.

Example 13 may include a method of cache line sparing, comprising storing cache line spare information in a first memory, detecting a first power state change for the first memory, and saving the cache line spare information to a second memory based on the detected first power state change.

Example 14 may include the method of Example 13, further comprising determining if the detected first power state change results in a potential loss of data in the first memory.

Example 15 may include the method of Example 13, further comprising saving the cache line spare information to a reserved system memory based on the detected first power state change.

Example 16 may include the method of Example 15, wherein the logic is further to limiting access to the reserved system memory.

Example 17 may include the method of any of Examples 13 to 16, further comprising detecting a second power state change, and restoring the cache line spare information to the first memory from the second memory based on the detected second power state change.

Example 18 may include the method of Example 17, further comprising restoring the cache line spare information prior to general memory access.

Example 19 may include at least one computer readable medium, comprising a set of instructions, which when executed by a computing device, cause the computing device to store cache line spare information in a first memory, detect a first power state change for the first memory, and save the cache line spare information to a second memory based on the detected first power state change.

Example 20 may include the at least one computer readable medium of Example 19, comprising a further set of instructions, which when executed by the computing device, cause the computing device to determine if the detected first power state change results in a potential loss of data in the first memory.

Example 21 may include the at least one computer readable medium of Example 19, comprising a further set of instructions, which when executed by the computing device, cause the computing device to save the cache line spare information to a reserved system memory based on the detected first power state change.

Example 22 may include the at least one computer readable medium of Example 21, comprising a further set of instructions, which when executed by the computing device, cause the computing device to limit access to the reserved system memory.

Example 23 may include the at least one computer readable medium of any of Examples 19 to 22, comprising a further set of instructions, which when executed by the computing device, cause the computing device to detect a second power state change, and restore the cache line spare information to the first memory from the second memory based on the detected second power state change.

Example 24 may include the at least one computer readable medium of Example 23, comprising a further set of instructions, which when executed by the computing device, cause the computing device to restore the cache line spare information prior to general memory access.

Example 25 may include a memory controller apparatus, comprising means for storing cache line spare information in a first memory, means for detecting a first power state change for the first memory, and means for saving the cache line spare information to a second memory based on the detected first power state change.

Example 26 may include the apparatus of Example 25, further comprising means for determining if the detected first power state change results in a potential loss of data in the first memory.

Example 27 may include the apparatus of Example 25, further comprising means for saving the cache line spare information to a reserved system memory based on the detected first power state change.

Example 28 may include the apparatus of Example 27, wherein the logic is further to means for limiting access to the reserved system memory.

Example 29 may include the apparatus of any of Examples 25 to 28, further comprising means for detecting a second power state change, and means for restoring the cache line spare information to the first memory from the second memory based on the detected second power state change.

Example 30 may include the apparatus of Example 29, further comprising means for restoring the cache line spare information prior to general memory access.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
  a memory controller;
  a first memory communicatively coupled to the memory controller;
  a processor communicatively coupled to the memory controller;
  a second memory communicatively coupled to the processor; and
  logic communicatively coupled to the memory controller, the first memory, the processor, and the second memory to:
    store cache line spare information in the first memory, detect a first power state change for the first memory, and save the cache line spare information to the second memory based on the detected first power state change.

2. The system of claim 1, wherein the logic is further to: determine if the detected first power state change results in a potential loss of data in the first memory.

3. The system of claim 1, wherein the second memory comprises reserved system memory, and wherein the logic is further to:

save the cache line spare information to the reserved system memory based on the detected first power state change.

4. The system of claim 1, wherein the logic is further to: detect a second power state change; and restore the cache line spare information to the first memory from the second memory based on the detected second power state change.

5. The system of claim 3, wherein the logic is further to: limit access to the reserved system memory.

6. The system of claim 4, wherein the logic is further to: restore the cache line spare information prior to general memory access.

7. A semiconductor package apparatus, comprising:

one or more substrates; and logic coupled to the one or more substrates, wherein the logic is at least partly implemented in one or more of configurable logic or fixed-functionality logic hardware, the logic coupled to the one or more substrates to:

store cache line spare information in a first memory, wherein the first memory is communicatively coupled to a memory controller, detect a first power state change for the first memory, and save the cache line spare information to a second memory based on the detected first power state change, wherein the second memory is communicatively coupled to a processor.

8. The apparatus of claim 7, wherein the logic is further to:

determine if the detected first power state change results in a potential loss of data in the first memory.

9. The apparatus of claim 7, wherein the logic is further to:

save the cache line spare information to a reserved system memory based on the detected first power state change.

10. The apparatus of claim 7, wherein the logic is further to:

detect a second power state change; and restore the cache line spare information to the first memory from the second memory based on the detected second power state change.

11. The apparatus of claim 9, wherein the logic is further to:

limit access to the reserved system memory.

12. The apparatus of claim 10, wherein the logic is further to:

restore the cache line spare information prior to general memory access.

13. A method of cache line sparing, comprising:

storing cache line spare information in a first memory, wherein the first memory is communicatively coupled to a memory controller;

detecting a first power state change for the first memory; and saving the cache line spare information to a second memory based on the detected first power state change, wherein the second memory is communicatively coupled to a processor.

14. The method of claim 13, further comprising:

determining if the detected first power state change results in a potential loss of data in the first memory.

15. The method of claim 13, further comprising:

saving the cache line spare information to a reserved system memory based on the detected first power state change.

16. The method of claim 13, further comprising:

detecting a second power state change; and restoring the cache line spare information to the first memory from the second memory based on the detected second power state change.

17. The method of claim 15, further comprising:

limiting access to the reserved system memory.

18. The method of claim 16, further comprising:

restoring the cache line spare information prior to general memory access.

19. At least one computer readable medium, comprising a set of instructions, which when executed by a computing device, cause the computing device to:

store cache line spare information in a first memory, wherein the first memory is communicatively coupled to a memory controller;

detect a first power state change for the first memory; and save the cache line spare information to a second memory based on the detected first power state change, wherein the second memory is communicatively coupled to a processor.

20. The at least one computer readable medium of claim 19, comprising a further set of instructions, which when executed by the computing device, cause the computing device to:

determine if the detected first power state change results in a potential loss of data in the first memory.

21. The at least one computer readable medium of claim 19, comprising a further set of instructions, which when executed by the computing device, cause the computing device to:

save the cache line spare information to a reserved system memory based on the detected first power state change.

22. The at least one computer readable medium of claim 19, comprising a further set of instructions, which when executed by the computing device, cause the computing device to:

detect a second power state change; and restore the cache line spare information to the first memory from the second memory based on the detected second power state change.

23. The at least one computer readable medium of claim 21, comprising a further set of instructions, which when executed by the computing device, cause the computing device to:

limit access to the reserved system memory.

24. The at least one computer readable medium of claim 22, comprising a further set of instructions, which when executed by the computing device, cause the computing device to:

restore the cache line spare information prior to general memory access.

\* \* \* \* \*